(12) United States Patent
Chatterjee et al.

(10) Patent No.: US 12,557,117 B2
(45) Date of Patent: Feb. 17, 2026

(54) MULTI-SLOT PDCCH MONITORING IN SEARCH SPACE SETS FOR HIGHER CARRIER FREQUENCY OPERATION

(71) Applicant: Intel Corporation, Santa Clara, CA (US)

(72) Inventors: Debdeep Chatterjee, San Jose, CA (US); Daewon Lee, Portland, OR (US); Yingyang Li, Beijing (CN); Gang Xiong, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 340 days.

(21) Appl. No.: 18/280,423

(22) PCT Filed: Apr. 4, 2022

(86) PCT No.: PCT/US2022/023304
§ 371 (c)(1),
(2) Date: Sep. 5, 2023

(87) PCT Pub. No.: WO2022/216603
PCT Pub. Date: Oct. 13, 2022

(65) Prior Publication Data
US 2024/0155636 A1 May 9, 2024

Related U.S. Application Data

(60) Provisional application No. 63/250,893, filed on Sep. 30, 2021, provisional application No. 63/228,875, (Continued)

(51) Int. Cl.
*H04W 72/232* (2023.01)
*H04L 5/00* (2006.01)
*H04W 72/0446* (2023.01)

(52) U.S. Cl.
CPC ......... *H04W 72/232* (2023.01); *H04L 5/0094* (2013.01); *H04W 72/0446* (2013.01)

(58) Field of Classification Search
CPC ............ H04W 72/0446; H04W 72/232; H04L 5/0094
(Continued)

(56) References Cited

U.S. PATENT DOCUMENTS

2020/0389874 A1* 12/2020 Lin ........................ H04L 5/0053
2021/0127285 A1* 4/2021 Khoshnevisan ...... H04L 5/0053
2022/0295319 A1* 9/2022 Lin ........................ H04W 24/08

FOREIGN PATENT DOCUMENTS

WO      2020033652      2/2020
WO      WO-2022216603 A1   10/2022

OTHER PUBLICATIONS

"European Application Serial No. 22785226.6, Extended European Search Report mailed Apr. 15, 2025", 19 pgs.
(Continued)

*Primary Examiner* — Peter G Solinsky
(74) *Attorney, Agent, or Firm* — Schwegman Lundberg & Woessner, P.A.

(57) ABSTRACT

A user equipment (UE) configured for operation in a fifth-generation new radio (NR) system may decode higher-layer signalling comprising configuration information received from a gNodeB (gNB) that configures the UE with search space (SS) sets for multi-slot physical downlink control channel (PDCCH) monitoring. At least some slots of the SS sets may be indicated to have a PDCCH monitoring occasion (MO) and each SS set may be configured in a number (Y) of consecutive slots (MO slots) within slot groups of a slot group size that comprises of a number (X) of consecutive slots. The UE may perform multi-slot PDCCH monitoring by monitoring the MO slots for PDCCH candidates and non-overlapping control channel elements (CCEs). Slot
(Continued)

groups may have X consecutive slots (slot group size=X) and there are Y consecutive MO slots within each slot group.

20 Claims, 7 Drawing Sheets

Related U.S. Application Data filed on Aug. 3, 2021, provisional application No. 63/174,975, filed on Apr. 14, 2021, provisional application No. 63/170,997, filed on Apr. 5, 2021.

(58) Field of Classification Search
USPC .......................................... 370/329
See application file for complete search history.

(56) References Cited

OTHER PUBLICATIONS

"Japanese Application Serial No. 2023-557714, Notification of Reasons for Refusal mailed May 7, 2025", w English Translation, 9 pgs.
"3rd Generation Partnership Project;TechnicalSpecification Group Rad io Access Network, NR;Physical layer procedures for control (Release 17)", 3GPP TS38. 213 V17. 0. 0, (Dec. 2021,), 129-144.
"Japanese Application Serial No. 2023-557714, Notification of Reasons for Refusal mailed Dec. 24, 2024", w English translation, 11 pgs.
"European Application Serial No. 22785226.6, Partial Supplementary European Search Report mailed Jan. 22, 2025", 19 pgs.
"Japanese Application Serial No. 2023-557714, Response filed Mar. 18, 2025 to Notification of Reasons for Refusal mailed Dec. 24, 2024", w English Claims, 18 pgs.
Apple Inc., "A Discussion on Physical Layer Design for NR between 52.6GHz and 71 Ghz", 3GPP Draft; R1-2008457, 3rd Generation Partnership Project (3GPP), Mobile Competence Centre; 650, Route Des Lucioles ; F-06921 Sophia-Antipolis Cedex; France, vol. RAN WG1; XP052350385, (Nov. 1, 2020), 32 pgs.
Convida, Wireless, "Consideration for PDCCH Monitoring for Supporting NR from 52.6 GHz to 71 Ghz", 3GPP TSG RAN WG1 #104-e R1-2101418, [Online]. Retrieved from the Internet: URL:https: www.3gpp.org ftp tsg_ranWGI_RLI TSGRI_104e Docs R12101418. zip, (Jan. 19, 2021), 7 pgs.
Moderator (Lenovo), "Feature lead summary#3 for [104-e-NR-52-71GHz-02] on PDCCH monitoring enhancements", R1-2102242, 3GPP TSG RAN WG1 #104-e, (Feb. 8, 2021), 114 pgs.
Samsung, "Reduced PDCCH monitoring", 3GPP Draft; R1-2008171, 3rd Generationproject (3GPP), Mobile Competence Centre ; 650, Route Des Lucioles ; F-06921 Sophia-Antipolis Cedex ; France, vol. RAN WG1, [Online] Retrieved from the internet:https: ftp. 3gpp.org tsg_ranWG1_RL1 TSGR1_103-e Docs R1-2008171.zipR1-2008171 Reduction on PDCCH monitoring_v3.docx, (Nov. 1, 2020), 14 pgs.
"International Application Serial No. PCT/US2022/023304, International Search Report mailed Jul. 25, 2022", 3 pgs.
"International Application Serial No. PCT/US2022/023304, Written Opinion mailed Jul. 25, 2022", 4 pgs.
"PDCCH monitoring enhancement for NR 52.6-71GHz", Xiaomi, R1-2101110, 3GPP TSG RAN WG1 #104-e, (Jan. 18, 2021).
"PDCCH monitoring enhancements to support NR above 52.6 GHz", LG Electronics, RI-2100893, 3GPP TSG RAN WG1 #104-e, (Jan. 19, 2021).
"Remaining Issue of PDCCH Enhancements for NR URLLC", Ericsson, R1-2000230, 3GPP TSG RAN WG1 #100-e, (Feb. 15, 2020).
"Views on cross-carrier scheduling from an SCell to the PCell/PSCell", Qualcomm Incorporated, R1-2009277, 3GPP TSG RAN WG1 #103-e, (Nov. 1, 2020).
"International Application Serial No. PCT US2022 023304, International Preliminary Report on Patentability mailed Oct. 19, 2023", 6 pgs.
"European Application Serial No. 22785226.6, Response to Communication Pursuant to Rules 161 and 162 EPC filed Apr. 2, 2024", 9 pgs.
"Japanese Application Serial No. 2023-557714, Response filed Aug. 5, 2025 to Notification of Reasons for Refusal mailed May 7, 2025", W English Claims, 21 pgs.
"European Application Serial No. 22785226.6, Response filed Oct. 20, 2025 to Extended European Search Report mailed Apr. 15, 2025", 17 pgs.

* cited by examiner

MULTI-SLOT PDCCH MONITORING IN SEARCH SPACE SETS FOR HIGHER CARRIER FREQUENCY OPERATION

PRIORITY CLAIMS

This application is a U.S. National Stage Filing under 35 U.S.C. 371 from International Application No. PCT/US2022/023304, filed Apr. 4, 2022 and published in English as WO 2022/216603 on Oct. 13, 2022, which claims the benefit of priority to U.S. Provisional Patent Application Ser. No. 63/170,997, filed Apr. 5, 2021, U.S. Provisional Patent Application Ser. No. 63/174,975, filed Apr. 14, 2021, U.S. Provisional Patent Application Ser. No. 63/228,875, filed Aug. 3, 2021, and U.S. Provisional Patent Application Ser. No. 63/250,893, filed Sep. 30, 2021, which are incorporated herein by reference in their entireties.

TECHNICAL FIELD

Embodiments pertain to wireless communications. Some embodiments relate to wireless networks including 3GPP (Third Generation Partnership Project) and fifth-generation (5G) networks including 5G new radio (NR) (or 5G-NR) networks. Some embodiments relate to sixth-generation (6G) networks. Some embodiments pertain physical downlink control channel (PDCCH) monitoring for higher-carrier frequency operations.

BACKGROUND

Mobile communications have evolved significantly from early voice systems to today's highly sophisticated integrated communication platform. With the increase in different types of devices communicating with various network devices, usage of 3GPP 5G NR systems has increased. The penetration of mobile devices (user equipment or UEs) in modern society has continued to drive demand for a wide variety of networked devices in many disparate environments. 5G NR wireless systems are forthcoming and are expected to enable even greater speed, connectivity, and usability, and are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

One issue with higher-carrier frequency operations (i.e., carrier frequencies above 52.6 GHz) is that the larger subcarrier spacing (SCS) is the shorter slot duration. This makes it more difficult for a UE to detect a PDCCH in these shorter slots. Thus, what is needed is improved techniques for PDCCH detection for higher-carrier frequency operations.

DETAILED DESCRIPTION

Figure 1A:
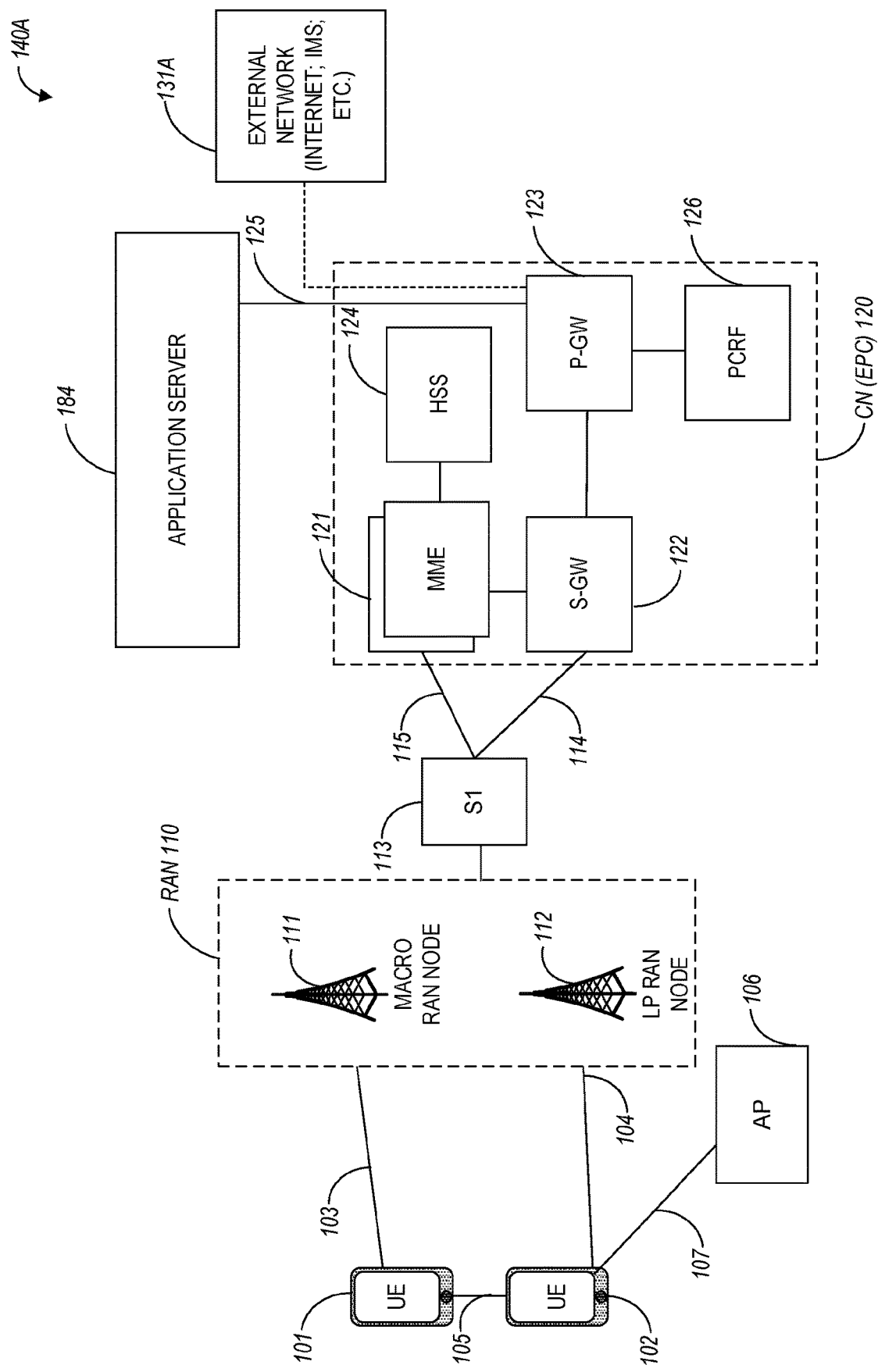
FIG. 1A illustrates an architecture of a network, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments are directed to physical downlink control channel (PDCCH) monitoring capability handing and search space set configurations for higher carrier frequency operations. Some embodiments are directed to multi-slot PDCCH monitoring. Some embodiments are directed to dropping overbooked search space sets. These embodiments are described in more detail below.

Some embodiments are directed to a user equipment (UE) configured for operation in a fifth-generation new radio (NR) system. In these embodiments, the UE may decode higher-layer signalling comprising configuration information received from a gNodeB (gNB). In these embodiments, the configuration information may configure the UE with search space (SS) sets for multi-slot physical downlink control channel (PDCCH) monitoring. In these embodiments, at least some slots of the SS sets may be indicated to have a PDCCH monitoring occasion (MO). In these embodiments, each SS set may be configured in a number (Y) of consecutive slots (MO slots) within slot groups of a slot group size that comprises of a number (X) of consecutive slots. In these embodiments, the UE may perform multi-slot PDCCH monitoring by monitoring the MO slots for PDCCH candidates and non-overlapping control channel elements (CCEs). In these embodiments, slot groups may have X consecutive slots (slot group size=X) and there are Y consecutive MO slots within each slot group, although the scope of the embodiments is not limited in this respect.

In some embodiments, when the SS sets comprise UE specific search space (USS) sets, the number (Y) of consecutive MO slots may be limited to no more than half the number (X) of consecutive slots within the slot groups of (X)

slots. In these embodiments, a total number of monitored PDCCH candidate and non-overlapping CCE may be limited by a monitoring capability (e.g., maximum numbers of monitored PDCCH candidates and non-overlapped CCEs), although the scope of the embodiments is not limited in this respect. These embodiments are discussed in more detail below.

In some of these embodiments, a SS set may be monitored within Y consecutive MO slots with a slot group of X slots. In some embodiments, the Y consecutive MO slots can be located anywhere within the slot group of X slots. In some embodiments, the location of the Y consecutive MO slots within the slot group of X slots may be maintained across different slot groups. In these embodiments, the start of the first slot group in a subframe may be aligned with the subframe boundary and the start of each slot group may be aligned with a slot boundary, although the scope of the embodiments is not limited in this respect.

In some embodiments, when the SS sets include USS sets, the UE may be configured to drop the USS sets in all the (Y) MO slots in an associated slot group when the USS sets are overbooked in the associated slot group and perform the multi-slot PDCCH monitoring by monitoring the (Y) MO slots for PDCCH candidates and non-overlapping CCEs in any USS sets that have not been dropped, although the scope of the embodiments is not limited in this respect.

In some embodiments, the UE may be configured to drop the USS sets based on a search space set index. In these embodiments, the USS sets of slot groups having a higher index are dropped before the USS sets of slot groups having a lower index. In these embodiments, all USS sets of a slot group are dropped, although the scope of the embodiments is not limited in this respect.

In some embodiments, the UE may be configured to determine a number of USS sets to drop from slot groups based on a monitoring capability associated with a serving cell, although the scope of the embodiments is not limited in this respect.

In some of these embodiments, when the SS sets include common search space (CSS) sets, the UE may refrain from dropping any of the CSS sets in one or more slot groups (i.e., because the UE does not expect overbooking for CSS sets). In these embodiments, when the SS sets comprise USS sets, Type 1 common search space (CSS) sets configured with dedicated RRC signalling, and Type 3 CSS, the number (Y) of consecutive MO slots may be limited to no more than half the number of consecutive slots within the slot groups of (X) slots, although the scope of the embodiments is not limited in this respect.

In these embodiments, SS set overbooking may be allowed with multi-slot PDCCH monitoring capability and may be applied per slot group. In these embodiments, SS set overbooking may be allowed for USS sets in PCells and PSCells, however the UE expects no overbooking for CSS sets in PCells and PSCells and no overbooking for SS sets in SCells. In these embodiments, a UE drops UE specific search space set(s) in a slot group with a higher index when SS sets are overbooked. In these embodiments, the UE does not expect overbooking in Type 1 and Type 3 CSS sets (i.e., overbooking may be only expected in USS sets), although the scope of the embodiments is not limited in this respect.

In some embodiments, when the UE has a capability to support multi-slot PDCCH monitoring for multiple combinations that include a number of specific combinations of consecutive MO slots within slot groups of various slot group sizes, and when the SS sets configured to the UE include one or more of the specific combinations supported by the UE (i.e., the SS set configured to the UE satisfy the specific combinations), the UE may select up to two or more of the specific combinations that were configured to the UE that have a largest value for the number of consecutive slots in a slot group. In these embodiments, the largest value may correspond to a greatest number of monitored PDCCH candidates and non-overlapping CCEs. In these embodiments, the UE may report that it has capability to support four combinations of X and Y (e.g., (4,1) (4,2) (8,1) (8,4)) of consecutive MO slots within slot groups of various slot group sizes. If the SS sets configured to the UE satisfy at least some of these supported combinations (e.g., combinations (e.g., (4,2) (8,4)), the UE may select combination (8,4) (i.e., the combination having largest value for the number of consecutive slots in a slot group, although the scope of the embodiments is not limited in this respect. In these embodiments, the UE may indicate to the gNB that it supports multi-slot PDCCH monitoring, although the scope of the embodiments is not limited in this respect.

In some embodiments, when the UE has a capability to support multi-slot PDCCH monitoring for multiple combinations that include various numbers (Y) of consecutive MO slots within slot groups of a same size (i.e., the same value of X for different values of Y), the UE may determine a maximum number of monitored PDCCH candidates and non-overlapping CCEs to monitor based on the number (X) of consecutive MO slots of a slot group. In these embodiments, the maximum blind decoding (BD)/CCE budget may be determined by X (i.e., the number of consecutive MO slots in a slot group and not by Y, the number of slots of a slot group), although the scope of the embodiments is not limited in this respect.

In some embodiments, when the UE is configured for multiple serving cells and has a capability to support multi-slot PDCCH monitoring for multiple combinations that include various numbers (Y) of consecutive MO slots within slot groups of a various sizes (i.e., multiple combinations of X and Y), the UE may determine a maximum number of monitored PDCCH candidates and non-overlapping CCEs to monitor based on the number (X) of consecutive slots of a slot group for each of the serving cells. In these embodiments, to determine the maximum number, the UE may group together serving cells having slot groups with a same size (i.e., a same number of (X) of consecutive slots in a slot group). In these embodiments, multiple cells that have a same slot group size (X) share BD/CCE budget, although the scope of the embodiments is not limited in this respect.

In some embodiments, when the UE is configured for multiple serving cells and has a capability to support multi-slot PDCCH monitoring for multiple combinations that include various numbers (Y) of consecutive MO slots within slot groups of a various sizes (i.e., multiple combinations of X and Y), and when a serving cell for the UE is configured with dynamic switching of two of the multiple combinations e.g., search space set group (SSSG) switching), the UE may determine a maximum number of monitored PDCCH candidates and non-overlapping CCEs to monitor for each of the multiple combinations and may drop any USS sets in one or more slot groups when the USS sets are overbooked, although the scope of the embodiments is not limited in this respect.

In some embodiments, for a downlink bandwidth part (DL BWP) with a 960 kHz subcarrier spacing (SCS), a maximum number of monitored PDCCH candidates per a slot group of four consecutive slots (i.e., X=4) may be limited to half the maximum number of monitored PDCCH candidates per a slot group of eight consecutive slots (i.e., X=8), and a maximum number of non-overlapping CCEs per a slot group of four consecutive slots (i.e., X=4) may be limited to half the maximum number of non-overlapping CCEs per a slot group of eight consecutive slots (i.e., X=8). In these embodiments, for a DL BWP with the 960 kHz SCS, the maximum number of monitored PDCCH candidates per a slot group of four consecutive slots (i.e., X=4) may be ten and the maximum number of monitored PDCCH candidates per a slot group of eight consecutive slots (i.e., X=8) may be 20. In these embodiments, for a DL BWP with the 960 kHz SCS, the maximum number of non-overlapping CCEs per a slot group of four consecutive slots (i.e., X=4) may be sixteen and the maximum number of non-overlapping CCEs per a slot group of eight consecutive slots (i.e., X=8) may be thirty-two. In these embodiments, for a DL BWP with a 480 kHz SCS, the maximum number of monitored PDCCH candidates per a slot group of four consecutive slots (i.e., X=4) may be twenty and the maximum number of non-overlapping CCEs per a slot group of four consecutive slots (i.e., X=4) may be thirty-two, although the scope of the embodiments is not limited in this respect.

In some embodiments, when the UE has a capability to support multi-slot PDCCH monitoring for multiple combinations that include various numbers (Y) of consecutive MO slots within slot groups of various slot group sizes (i.e., multiple combinations of X and Y), for an SCS of 480 kHz, the number (X) of consecutive slots of the slot group may be four and the number (Y) of consecutive MO slots within each SS set that comprise the PDCCH MO may be two. In these embodiments, for an SCS of 960 kHz, the number (X) of consecutive slots of the slot group may be eight and the number (Y) of consecutive MO slots within each SS set that comprise the PDCCH MO may be four. In these embodiments, the number (X) of consecutive slots of the slot group and the number (Y) of consecutive MO slots within each SS set that comprise the PDCCH MO may be based on a subcarrier spacing (SCS), although the scope of the embodiments is not limited in this respect.

In some embodiments, the UE may be configured to perform multi-slot PDCCH monitoring for higher-frequency operations comprising operations with carrier frequencies above 52.6 GHz with a subcarrier spacing (SCS) of 480 kHz and 960 kHz. In these embodiments, the UE may refrain from performing the multi-slot PDCCH monitoring for the higher-frequency operations with a SCS of 120 kHz. In these embodiments, the UE may refrain from performing the multi-slot PDCCH monitoring for lower-frequency operations comprising operations with carrier frequencies below 52.6 GHz, although the scope of the embodiments is not limited in this respect.

Some embodiments are directed to a non-transitory computer-readable storage medium that stores instructions for execution by processing circuitry of a user equipment (UE) configured for operation in a fifth-generation new radio (NR) system. In these embodiments, the instructions may configure the processing circuitry to decode higher-layer signalling comprising configuration information received from a gNodeB (gNB). In these embodiments, the configuration information may configure the UE with search space (SS) sets for multi-slot physical downlink control channel (PDCCH) monitoring. At least some slots of the SS sets may be indicated to have a PDCCH monitoring occasion (MO). In these embodiments, each SS set may be configured in a number (Y) of consecutive slots (MO slots) within slot groups of a slot group size that comprises of a number (X) of consecutive slots. In these embodiments, the UE may perform multi-slot PDCCH monitoring by monitoring the MO slots for PDCCH candidates and non-overlapping control channel elements (CCEs), although the scope of the embodiments is not limited in this respect.

Some embodiments are directed to a gNodeB (gNB) configured for operation in a fifth-generation new radio (NR) system. In these embodiments, the gNB may encode higher-layer signalling comprising configuration information for transmission to a user equipment (UE). In these embodiments, the configuration information may configure the UE with search space (SS) sets for multi-slot physical downlink control channel (PDCCH) monitoring. At least some slots of the SS sets may be indicated to have a PDCCH monitoring occasion (MO). In these embodiments, each SS set may be configured in a number (Y) of consecutive slots (MO slots) within slot groups of a slot group size that comprises of a number (X) of consecutive slots. In these embodiments, the higher-layer signalling may configure the UE to perform multi-slot PDCCH monitoring by monitoring the MO slots for PDCCH candidates and non-overlapping control channel elements (CCEs), although the scope of the embodiments is not limited in this respect. These embodiments are described in more detail below.

FIG. 1A illustrates an architecture of a network in accordance with some embodiments. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some embodiments, carrier aggregation may be used where one or more component carriers operate on unlicensed frequencies.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some embodiments, any of the UEs 101 and 102 can comprise an Internet-of-Things (IoT) UE or a Cellular IoT (CIoT) UE, which can comprise a network access layer designed for low-power IoT applications utilizing short-lived UE connections. In some embodiments, any of the UEs

101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some embodiments, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro-RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMES 121.

In this aspect, the CN 120 comprises the MMES 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility embodiments in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some embodiments, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some embodiments, the gNBs and the NG-eNBs can be connected to the AMF by NG-C interfaces, and to the UPF by NG-U interfaces. The gNBs and the NG-eNBs can be coupled to each other via Xn interfaces.

In some embodiments, the NG system architecture can use reference points between various nodes as provided by 3GPP Technical Specification (TS) 23.501 (e.g., V15.4.0, 2018-12). In some embodiments, each of the gNBs and the NG-eNBs can be implemented as a base station, a mobile edge server, a small cell, a home eNB, and so forth. In some embodiments, a gNB can be a master node (MN) and NG-eNB can be a secondary node (SN) in a 5G architecture.

Figure 1B:
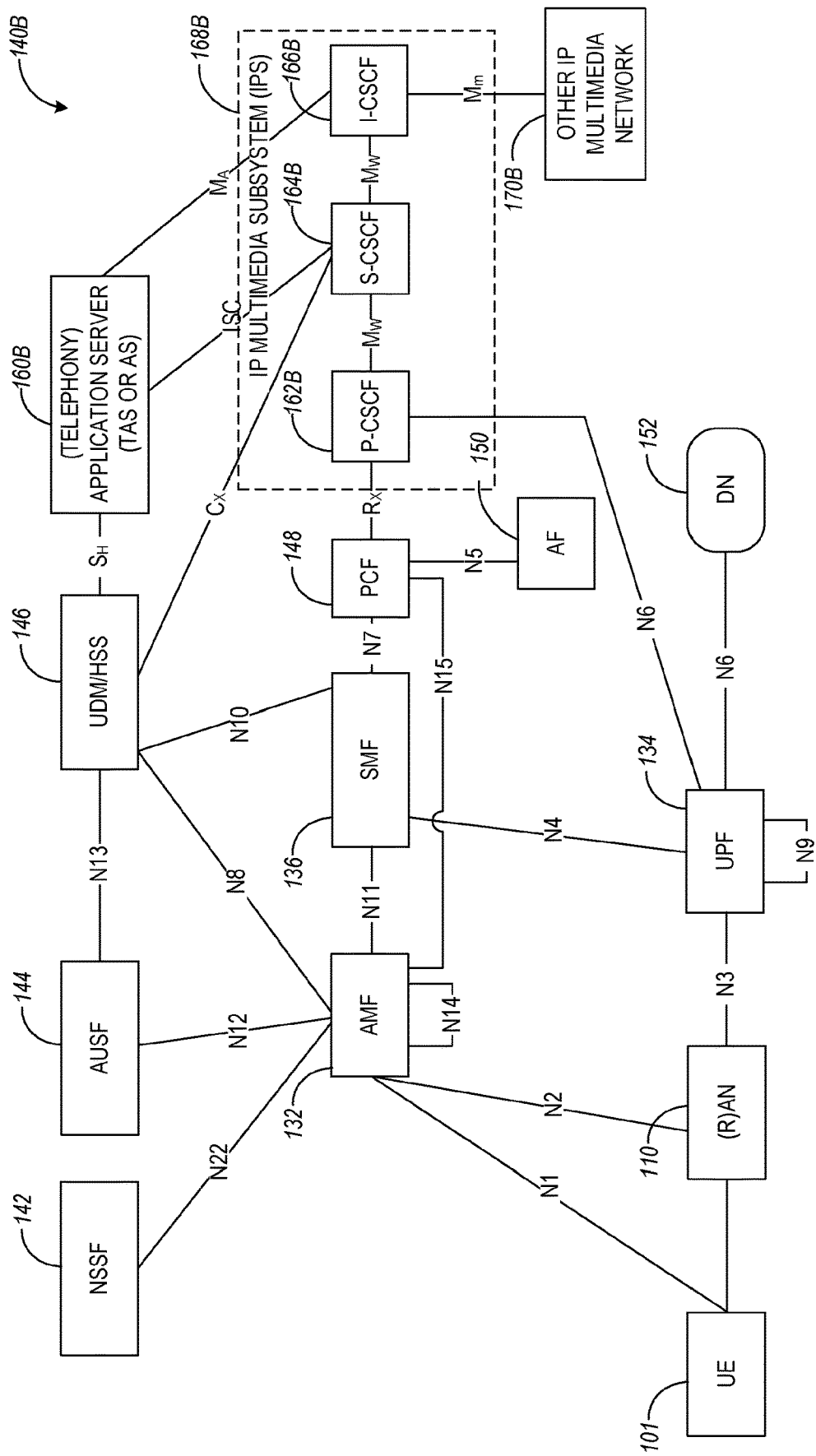
FIG. 1B and FIG. 1C illustrate a non-roaming 5G system architecture, in accordance with some embodiments.

FIG. 1B illustrates a non-roaming 5G system architecture in accordance with some embodiments. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some embodiments, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain embodiments of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some embodiments, the I-CSCF 166B can be connected to another IP multimedia network 170E, e.g. an IMS operated by a different network operator.

In some embodiments, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
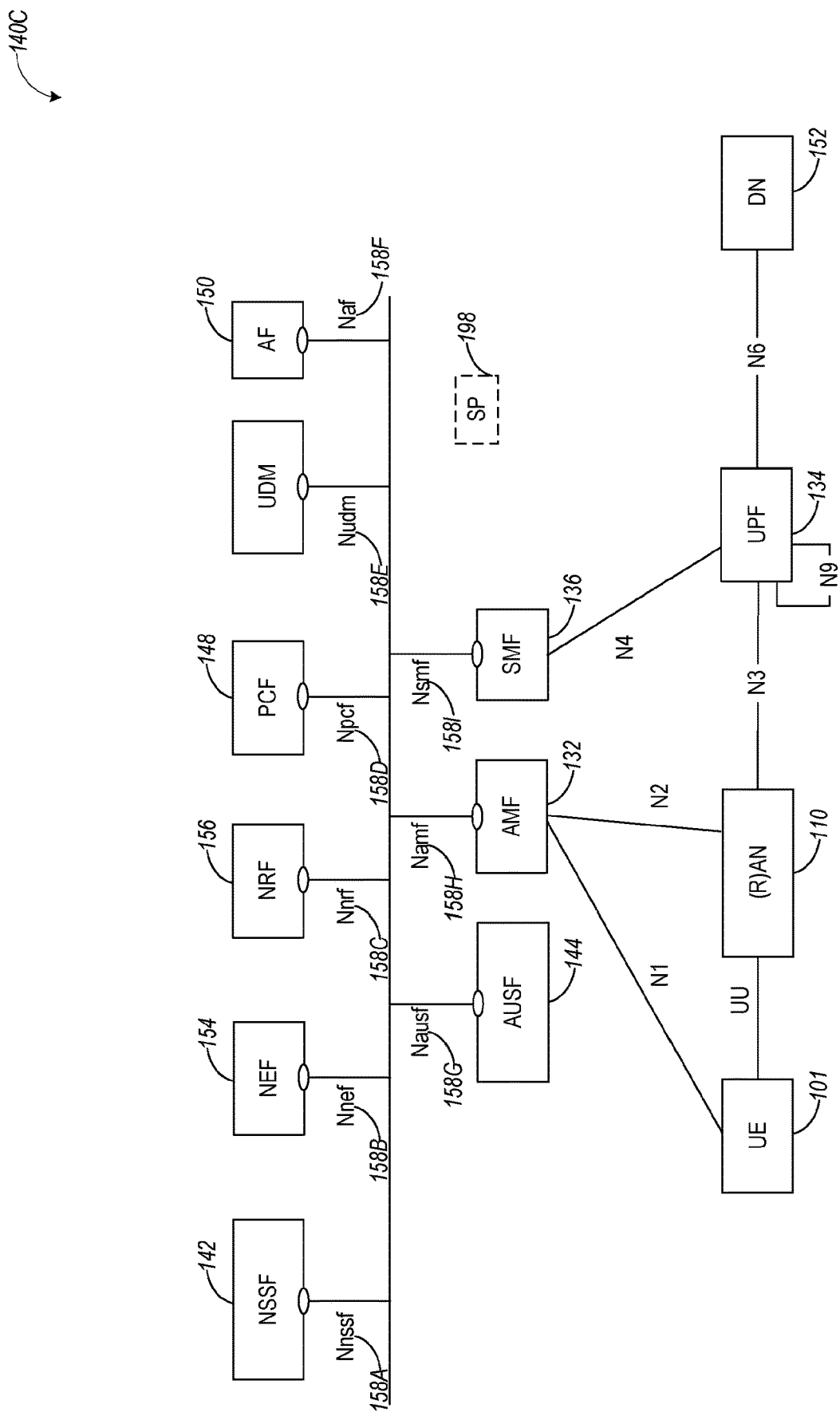

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some embodiments, 5G system architectures can be service-based and interaction between network functions can be represented by corresponding point-to-point reference points Ni or as service-based interfaces.

In some embodiments, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In some embodiments, any of the UEs or base stations described in connection with FIGS. 1A-1C can be configured to perform the functionalities described herein.

Rel-15 NR systems are designed to operate on the licensed spectrum. The NR-unlicensed (NR-U), a shorthand notation of the NR-based access to unlicensed spectrum, is a technology that enables the operation of NR systems on the unlicensed spectrum.

Figure 2:
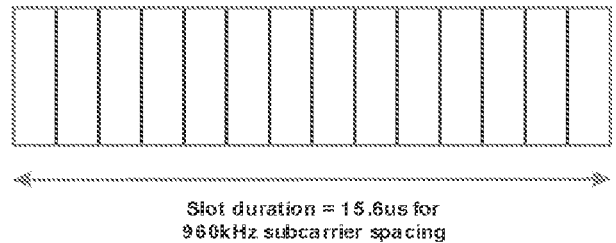
FIG. 2 illustrates a short slot duration for larger subcarrier spacings (SCSs) in accordance with some embodiments.

As defined in NR, one slot has 14 symbols. For system operating above 52.6 GHz carrier frequency, if larger subcarrier spacing (SCS), e.g., 960 kHz is employed, the slot duration can be very short. For instance, for SCS 960 kHz, one slot duration is approximately 15.61 µs as shown in FIG. 2.

In NR, a control resource set (CORESET) is a set of time/frequency resources carrying PDCCH transmissions. The CORESET is divided into multiple control channel element (CCE). A physical downlink control channel (PDCCH) candidate with aggregation level (AL) L consists of L CCEs. L could be 1, 2, 4, 8, 16. A search space set can be configured to a UE, which configures the timing for PDCCH monitoring and a set of CCEs carrying PDCCH candidates for the UE. A UE can be configured with up to 40 search space sets for a serving cell. The maximum number of search space sets per bandwidth part (BWP) is 10.

In NR Rel-15, when subcarrier spacing is increased from 15 kHz to 120 kHz, maximum number of BDs and CCEs for PDCCH monitoring is reduced substantially. This is primarily due to UE processing capability with short symbol and slot duration. For system operating between 52.6 GHz and 71 GHz carrier frequency, when a large subcarrier spacing is introduced, it is envisioned that maximum number of BDs and CCEs for PDCCH monitoring would be further scaled down. For instance, the number of BDs for PDCCH monitoring may be reduced to ~10 or even smaller values when 960 kHz subcarrier spacing is employed.

In NR-U, search space set group (SSSG) switching is supported for the PDCCH monitoring of UE. In a typical configuration, a default SSSG is configured with frequent PDCCH monitoring occasions at least for DCI format 2_0. Once a gNB gets the channel access after a successful listen-before-talk (LBT) operation, the gNB can quickly transmit a DCI 2_0 to indicate the channel occupation. On the other hand, inside the gNB-initiated COT, UE can switch to PDCCH monitoring according to a second SSSG configuration which may not include frequent PDCCH monitoring occasions.

Some embodiments disclosed herein provide a detailed design for handling UE capability on PDCCH monitoring and search space set configuration when SSSG switching is considered. Some embodiments disclosed herein provide a detailed design for PDCCH monitoring capability handling and search space set configurations in system operating above 52.6 GHz carrier frequency.

PDCCH Monitoring Capability

For systems operating at higher carrier frequencies, when a large subcarrier spacing (SCS) is introduced, it is envisioned that maximum numbers of monitored PDCCH candidates and non-overlapped CCEs for PDCCH monitoring would be further scaled down. Especially for non-overlapped CCEs, it causes limitation on the aggregation level (AL) of a PDCCH candidate. For example, if the maximum number of non-overlapped CCEs is less than 8, both PDCCH AL 8 and AL 16 cannot be supported in high frequency. On the other hand, if the total number of monitored PDCCH candidates and non-overlapped CCEs in a slot is not reduced, the total number of monitored PDCCH candidates and non-overlapped CCEs in the consecutive slots become quite larger, which enforces an extreme high UE capability for PDCCH monitoring.

To balance PDCCH monitoring in a slot and in multiple consecutive slots, the PDCCH monitoring capability can be defined so that the maximum numbers for PDCCH monitoring applies to a group of consecutive slots. The total numbers of monitored PDCCH candidates and non-overlapped CCEs in the group of slots are respectively limited to the corresponding maximum numbers.

Figure 3A:
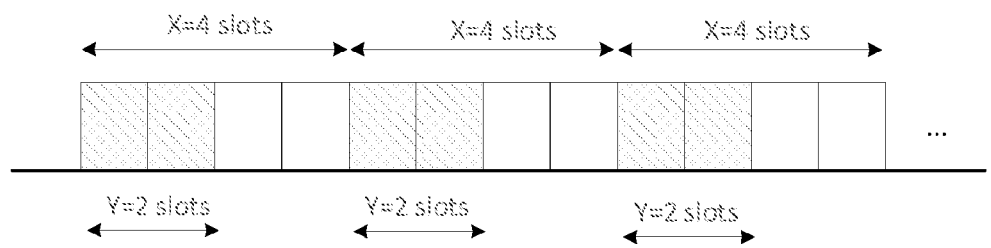
FIG. 3A illustrates an example of PDCCH monitoring capability for a fixed group pattern of X slots, in accordance with some embodiments.

In a first option, in a PDCCH monitoring capability, the PDCCH MOs can only be configured in Y slots, e.g. the first Y consecutive slots within every group of X consecutive slots, Y<X. The position of the Y slots can be fixed in all the X-slot groups. The total number of monitored PDCCH candidates and non-overlapped CCEs in the Y slots are limited by the corresponding maximum numbers of the PDCCH monitoring capability. The number and positions of slots that are configured with PDCCH MOs in the Y slots may be same or different in the different slot groups. FIG. 3A illustrate one example of PDCCH monitoring capability defined in the first 2 slots in each group of Y slots. Alternatively, X and/or Y could be defined in number of symbols, e.g. Y can be up to 3 symbols, or Y can be larger than 3 symbols. This capability can be expressed as a combination of (X, Y) with X being the fixed size of slot group.

In a second option, a PDCCH monitoring capability is defined by combination (X, Y), where the PDCCH MOs are configured in each slot in a span of up to Y consecutive slots and the distance between the start slots of two adjacent spans is at least X slots, Y<X. Alternatively, the PDCCH MOs are configured in a span of Y consecutive symbols and/or X may also be defined in number of symbols. For example, Y can be up to 3 symbols, or Y can be larger than 3 symbols. This capability can be expressed as a combination of (X, Y) with X being the minimum gap between two spans. A span is defined starting from a first slot with configured PDCCH MOs. FIG. 3 illustrate one example that a span has up to 2 slots and the gap between spans is 4 slots.

In some embodiments, if the PDCCH monitoring capability is defined in the Y slots in a groups of X slot, or in a span of Y slots of combination (X, Y), if the numbers of monitored PDCCH candidates and/or non-overlapped CCEs in the Y slots exceed the corresponding maximum numbers, dropping USS sets is done until the corresponding maximum numbers are not exceeded. This is also known as PDCCH overbooking. For example, a USS set with a largest SS set index that is configured in the Y slots is dropped. The procedure is repeated until that the maximum numbers are not exceeded. Equivalently, the PDCCH overbooking procedure may be expressed as keeping the USS sets with smallest SS set indexes until the maximum numbers of monitored PDCCH candidates and/or non-overlapped CCEs are reached.

Figure 4:
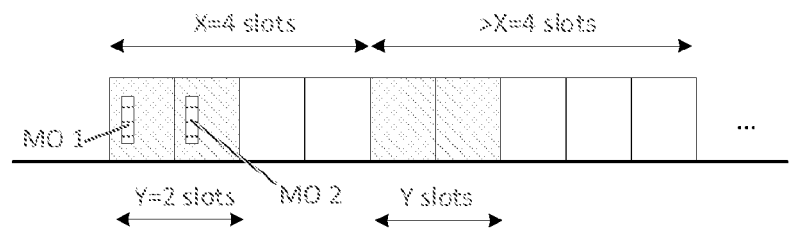
FIG. 4 illustrates an example of PDCCH monitoring occasions (MOs) in Y=2 slots, in accordance with some embodiments

In some embodiments, if a USS set configured in multiple slots in the Y slots, and if the USS set is to be dropped, the USS set is dropped in all the multiple slots. FIG. 4 illustrates the configuration of MOs for a USS set with highest SS set id in the Y=2 slots. If the numbers of monitored PDCCH candidates and/or non-overlapped CCEs in the Y slots exceed the corresponding maximum numbers, MO 1 and MO2 of the USS set are dropped together.

In some other embodiments, if a USS set configured in multiple slots in the Y slots, and if the USS set is to be dropped, UE drops the MOs of the USS set in one remaining slot of the multiple slots. In FIG. 4, if the numbers of monitored PDCCH candidates and/or non-overlapped CCEs in the Y slots exceed the corresponding maximum numbers, MO 2 of the USS set in the second slot is dropped first. If the numbers still exceed the corresponding maximum numbers, MO 1 of the USS set in the first slot is dropped too. In some embodiments, in carrier aggregation, if the PDCCH monitoring capability is defined in the Y slots in a groups of X slot, or in a span of Y slots of combination (X, Y), the maximum numbers of monitored PDCCH candidates and non-overlapped CCEs for a serving cell can be determined by X and Y which are parameters in the definition of PDCCH monitoring capability. In NR, two sets of the maximum numbers for PDCCH monitoring are applicable. One set are the maximum numbers for PDCCH monitoring for one scheduled serving cell, which are denoted as $M_{PDCCH}^{max,slot,\mu}$ and $C_{PDCCH}^{max,slot,\mu}$ respectively. The other set is the maximum numbers that applies to multiple serving cells, which are denoted as $M_{PDCCH}^{total}$ and $C_{PDCCH}^{total}$ respectively $M_{PDCCH}^{total}$ and $C_{PDCCH}^{total}$ correspond to $M_{PDCCH}^{total,slot,\mu}$ and $C_{PDCCH}^{total,slot,\mu}$ in Rel-15 that are determined for multiple serving cells with the same SCS configuration P in section 10.1 in TS38.213.

In some embodiments, $M_{PDCCH}^{total}$ and $C_{PDCCH}^{total}$ are determined for the serving cell(s) with the same configuration μ and PDCCH monitoring capability with same X and Y.

In some other embodiments, $M_{PDCCH}^{total}$ and $C_{PDCCH}^{total}$ are determined for the serving cell(s) with the same configuration μ and PDCCH monitoring capability with same X. The multiple PDCCH monitoring capabilities of the multiple serving cells have same maximum numbers of monitored PDCCH candidates and non-overlapped CCEs. Alternatively, the multiple PDCCH monitoring capabilities of the multiple serving cells can have different maximum numbers of monitored PDCCH candidates and non-overlapped CCEs.

Figure 5:
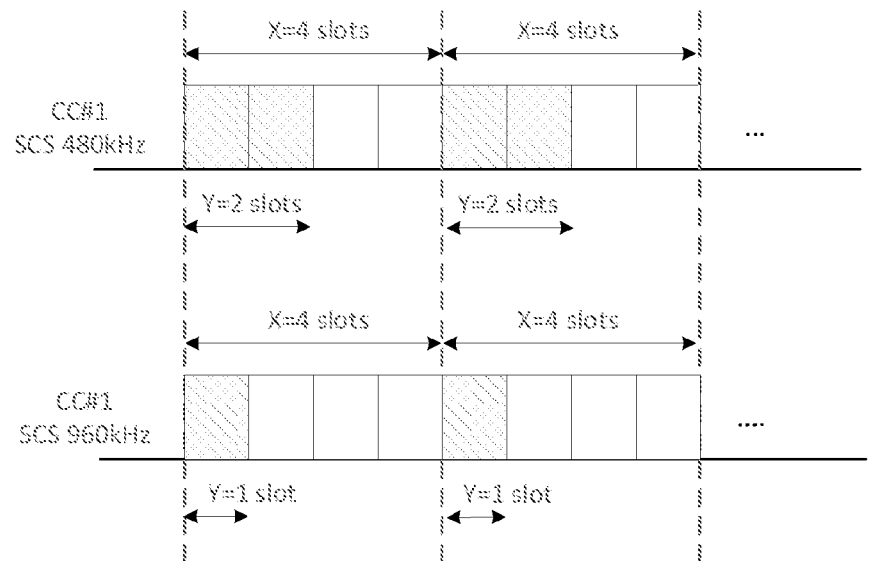
FIG. 5 illustrates an example of a maximum number of monitored PDCCH candidates and non-overlapped control-channel elements (CCEs), in accordance with some embodiments.

FIG. 5 illustrates the maximum numbers of monitored PDCCH candidates and non-overlapped CCEs for CC #1 with SCS 480 kHz, X=4 and Y=2, and CC #2 with SCS 480 kHz, X=4 and Y=1. Since the two CCs have same SCS and same duration of slot group, $M_{PDCCH}^{total}$ and $C_{PDCCH}^{total}$ are determined for the two CCs.

In some other embodiments, $M_{PDCCH}^{total}$ and $C_{PDCCH}^{total}$ PDCCH are determined for the serving cell(s) with the same absolute duration of the X slots defined in the PDCCH monitoring capability. The multiple PDCCH monitoring capabilities of the multiple serving cells have same maximum numbers of monitored PDCCH candidates and non-overlapped CCEs. Alternatively, the multiple PDCCH monitoring capabilities of the multiple serving cells can have different maximum numbers of monitored PDCCH candidates and non-overlapped CCEs.

In some embodiments, $M_{PDCCH}^{total}$ and $C_{PDCCH}^{total}$ are determined for the serving cell(s) with the same absolute durations of the X and Y slots or symbols defined in the PDCCH monitoring capability. The multiple PDCCH monitoring capabilities of the multiple serving cells have same maximum numbers of monitored PDCCH candidates and non-overlapped CCEs. Alternatively, the multiple PDCCH monitoring capabilities of the multiple serving cells can have different maximum numbers of monitored PDCCH candidates and non-overlapped CCEs.

Figure 6:
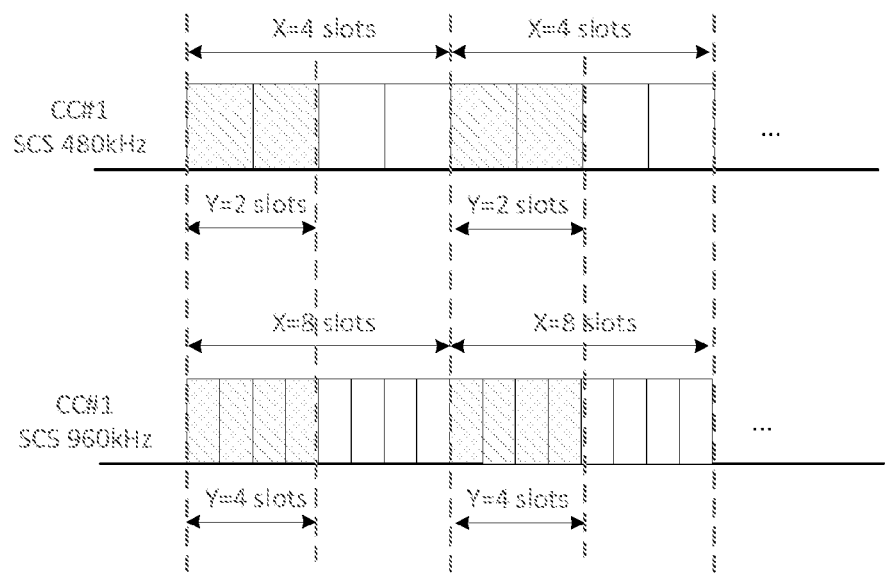
FIG. 6 illustrates another example of a maximum number of monitored PDCCH candidates and non-overlapped CCEs, in accordance with some embodiments.

FIG. 6 illustrates the maximum numbers of monitored PDCCH candidates and non-overlapped CCEs for CC #1 with SCS 480 kHz, X=4 and Y=2, and CC #2 with SCS 960 kHz, X=8 and Y=4. Though the SCS is different, the duration of slot group and the Y slots containing PDCCH MOs are both same. $M_{PDCCH}^{total}$ and $C_{PDCCH}^{total}$ are determined for the two CCs.

Multiple PDCCH Monitoring Capabilities

A UE may be capable of one or multiple combinations (X, Y) of multi-slot PDCCH monitoring capabilities. The supported one or multiple combinations (X, Y) may be preconfigured. Alternatively, the supported one or multiple combinations (X, Y) can be reported by UE. The configured search space sets of the UE must satisfy at least one supported combination (X, Y) of the UE. For a UE that supports a set of combinations (X, Y), gNB may configure a subset in the set of combinations (X, Y) to the UE by a high layer signaling. Accordingly, the configured search space sets of the UE must satisfy at least one combination (X, Y) from the configured subset of combinations (X, Y).

In some embodiments, a UE can support one or multiple combinations (X, Y) of multi-slot PDCCH monitoring capabilities. Alternatively, a UE can support the per-slot PDCCH monitoring capability and one or multiple combinations (X, Y) of multi-slot PDCCH monitoring capabilities. The multiple combinations (X, Y) belong to a same option from the above first or second option of multi-slot PDCCH monitoring capability (shown in FIG. 3A and FIG. 3B). The multiple combinations (X, Y) are differentiated by different value X and/or Y. Alternatively, the multiple combinations (X, Y) may belong to the same or different options from the above first or second option of multi-slot PDCCH monitoring capability (shown in FIG. 3A and FIG. 3B).

In some embodiments, the multiple combinations (X, Y) may associate with same maximum numbers of monitored PDCCH candidates and non-overlapped CCEs. In one example, if multiple combinations (X, Y) with same X and different Y are supported by the UE, the multiple combinations (X, Y) may be associated with same maximum numbers of monitored PDCCH candidates and non-overlapped CCEs in a period of X slots. By this way, when the pattern of PDCCH monitoring changes, the numbers of monitored PDCCH candidates and non-overlapped CCEs in X slots remain the same.

In some other embodiments, the multiple combinations (X, Y) may associate with different maximum numbers of monitored PDCCH candidates and non-overlapped CCEs. There is no limitation on the maximum numbers of monitored PDCCH candidates and non-overlapped CCEs of the multiple combinations (X, Y).

In some other embodiments, the multiple combinations (X, Y) may associate with different maximum numbers of monitored PDCCH candidates and non-overlapped CCEs. Further, the maximum numbers of monitored PDCCH candidates and non-overlapped CCEs for the combinations (X, Y) may be proportional to the values X. Denote the maximum number of monitored PDCCH candidates as $M_1$ and $M_2$ for two combinations (X1, Y1) and (X2, Y2), $M_1/M_2=X_1/X_2$, X2 is integer time of X1, the maximum number of monitored PDCCH candidates in a time period of X2 slots for the combination (X1, Y1) equals to $M_2$ which is same as the combination (X2, Y2). Further, for two combinations (X1, Y1) and (X2, Y2) supported by a UE, the ratio of X may also equal to the ratio of Y, i.e. $M_1/M_2=X_1/X_2=Y_1/Y_2$.

Specifically, per-slot PDCCH monitoring capability can be viewed as a combination (1, 1). Denote the maximum number of monitored PDCCH candidates as $M_1$ and $M_2$ respectively for the per-slot PDCCH monitoring capability and a combination (X, Y) of multi-slot PDCCH monitoring capability, $M_1/M_2=1/X$, or $M_1/M_2=1/X=1/Y$, the maximum number of monitored PDCCH candidates in time period X for the per-slot PDCCH monitoring capability equals to $M_2$ which is same as the combination (X, Y) of multi-slot PDCCH monitoring capability.

In some embodiments, if a UE can support multiple combinations (X, Y) of multi-slot PDCCH monitoring capabilities, and if the configured search space sets of the UE satisfy two or more of the multiple combinations (X, Y), the UE monitors PDCCH according to one combination (X, Y) from the two or more combinations (X, Y).

In some embodiments, the UE monitors PDCCH according to the combination (X, Y), from the two or more combinations (X, Y), that is associated with the largest maximum numbers of monitored PDCCH candidates and non-overlapped CCEs in the Y slots of the two or more combinations (X, Y).

In some other embodiments, the UE monitors PDCCH according to the combination (X, Y), from the two or more combinations (X, Y), that is associated with the largest value X of the two or more combinations (X, Y).

In some other embodiments, the UE monitors PDCCH according to the combination (X, Y), from the two or more combinations (X, Y), that is associated with the smallest value Y of the two or more combinations (X, Y).

In some other embodiments, the UE monitors PDCCH according to the combination (X, Y), from the two or more combinations (X, Y), that is determined by one or more of the following parameters in a priority:

maximum numbers of monitored PDCCH candidates and non-overlapped CCEs in the Y slots of the two or more combinations (X, Y);

value X of the two or more combinations (X, Y);

value Y of the two or more combinations (X, Y).

For example, the parameters may be checked in the order of decreasing priority:

Largest value X of the two or more combinations (X, Y);
Smallest value Y of the two or more combinations (X, Y).

Alternatively, the parameters may be checked in the order of decreasing priority:

Largest value X of the two or more combinations (X, Y);
Largest maximum numbers of monitored PDCCH candidates and non-overlapped CCEs in the Y slots of the two or more combinations (X, Y).

Alternatively, the parameters may be checked in the order of decreasing priority:

Largest maximum numbers of monitored PDCCH candidates and non-overlapped CCEs in the Y slots of the two or more combinations (X, Y);
Smallest value Y of the two or more combinations (X, Y).

Alternatively, the parameters may be checked in the order of decreasing priority:

Largest maximum numbers of monitored PDCCH candidates and non-overlapped CCEs in the Y slots of the two or more combinations (X, Y);
Largest value X of the two or more combinations (X, Y);
Smallest value Y of the two or more combinations (X, Y);

Alternatively, the parameters may be checked in the order of decreasing priority:

Largest value X of the two or more combinations (X, Y);
Largest maximum numbers of monitored PDCCH candidates and non-overlapped CCEs in the Y slots of the two or more combinations (X, Y);
Smallest value Y of the two or more combinations (X, Y).

PDCCH Monitoring for the Second SSSG

In NR operation, a search space set for PDCCH monitoring for a UE can be configured by high layer. Specifically, the search space set configuration includes monitoringSlotPeriodicityAndOffset, which indicates a PDCCH monitoring periodicity of $k_s$ slots and a PDCCH monitoring offset of $o_s$ slots. Further, the symbol(s) in a slot for PDCCH monitoring is controlled by monitoringSymbolsWithinSlot. For example, assuming one slot in each period of slots is used for the search space set, a better power saving can be obtained if larger $k_s$ is configured. On the hand, gNB needs to wait for a long time to find a PDCCH monitoring occasion for the search space set if the larger $k_s$ is used.

In NR-U, search space set group (SSSG) switching is supported for the PDCCH monitoring of UE. In a typical configuration, a first (default) SSSG is configured with frequent PDCCH monitoring occasions. Consequently, once gNB gets the channel occupation after a successful LBT, gNB can quickly start scheduling DL transmissions. On the other hand, inside the gNB-initiated COT, UE can switch to infrequent PDCCH monitoring according to a second SSSG configuration. The second SSSG configuration may include a larger number of PDCCH candidates with one or more DCI formats in a PDCCH monitoring occasion, which allows efficient DL and UL scheduling. In NR-U, SSSG switching from the first SSSG to the second SSSG can be triggered by an indicator in DCI 2_0 or by the reception of any PDCCH in the first SSSG. SSSG switching from the second SSSG to the first SSSG can be triggered by an indicator in DCI 2_0, by the end of indicated channel occupation time (COT), or by the expire of a timer.

UE needs a processing time, i.e. SSSG switching delay d1 to do SSSG switching. Further, an additional delay d2 is needed for the gNB to start scheduling DL and UL transmission using the second SSSG which is impacted by the PDCCH monitoring periodicity and offset for a search space set in the second SSSG. Since the second SSSG targets more efficient scheduling than the first SSSG, a larger value of d2 results in degraded DL and UL transmission performance.

Figure 7:
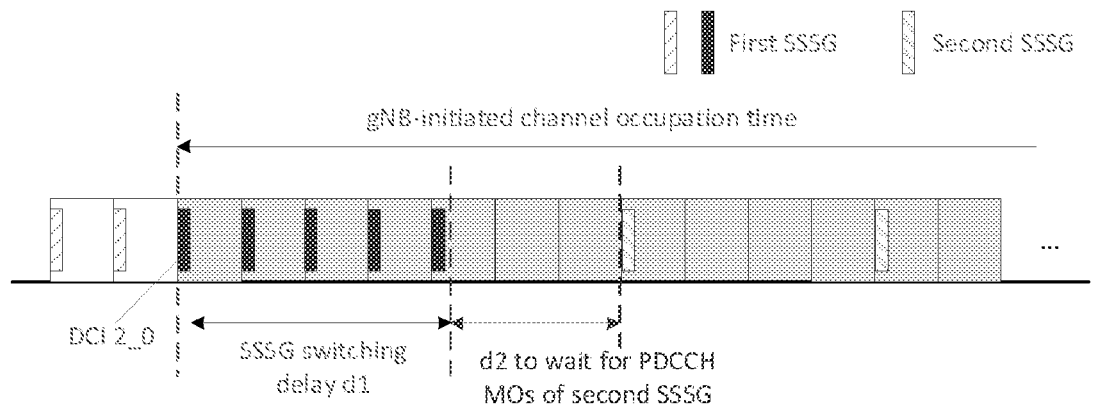
FIG. 7 illustrates delay for PDCCH monitoring associated with search space set group (SSSG) switching, in accordance with some embodiments.

FIG. 7 illustrates one example for effective delay when gNB can schedule a DL and UL transmission for a UE monitoring a PDCCH in the second SSSG. In this example, it is assumed that the periodicity for the search space set in the second SSSG is 4 slots. After detection of a DCI 2_0 which indicates SSSG switching, a switching delay d1 is required to process PDCCH monitoring following the second SSSG. An additional delay of d2 of about 3 slots is needed to wait for a valid PDCCH monitoring occasion of the second SSSG.

In some embodiments, an offset X to shift the configured search space set(s) in the second SSSG can be indicated by a DCI format in the first SSSG. For example, the DCI format 2_0 may be configured in the first SSSG which provides the offset X. By applying the offset X, the configured PDCCH monitoring occasion of a search space set in the second SSSG can be shifted to an earlier timing which satisfies the SSSG switching time d1. For example, the PDCCH monitoring pattern of each search space set can still be configured by NR parameter monitoringSlotPeriodicityAndOffset and monitoringSymbolsWithinSlot. Then the offset X is applied.

Figure 8:
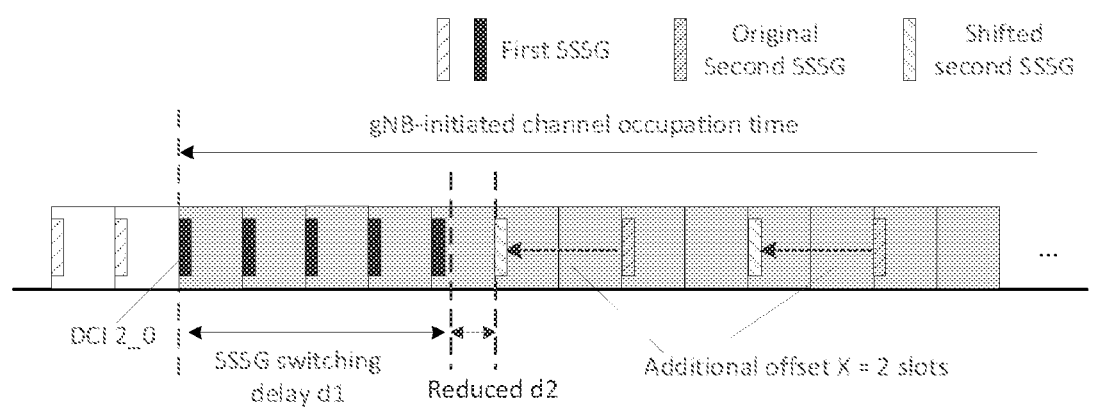
FIG. 8 illustrates delay reduction for PDCCH monitoring associated with SSSG switching of FIG. 7, in accordance with some embodiments.

FIG. 8 illustrates one example of delay reduction for gNB to schedule a DL and UL transmission for a UE monitoring a PDCCH in the second SSSG. The same assumption as FIG. 3A is used. The SSSG switching delay is still there. However, assuming left shift of 2 slots are indicated by the DCI 2_0 triggering SSSG switching, the additional delay d2 to the start of PDCCH monitoring of second SSSG can be less than 1 slot.

In some embodiments, DCI format 2_0 may include a SSSG switching flag per group of serving cells and an offset X to shift the configured search space set(s) in the second SSSG per group of serving cells. For example, when UE detects a DCI 2_0 in the first SSSG which indicates the switching to the second SSSG by search space set group switching flag, the offset X of the second SSSG applies to the configured PDCCH monitoring occasion of the second SSSG.

In some other embodiments, DCI format 2_0 may jointly indicate per group of serving cells the SSSG switching and the offset X. For example, Table 1 shows SSSG switching and offset X by 2 bits information.

TABLE 1

SSSG switching and offset X

| The indicator | SSSG switching | Offset X |
|---|---|---|
| 0 | To second SSSG | 1 slot |
| 1 | To second SSSG | 2 slots |
| 2 | To second SSSG | 4 slots |
| 3 | To first SSSG | — |

In some other embodiments, DCI format 2_0 may include an offset X to shift the configured search space set(s) in the second SSSG per group of serving cells, however, SSSG switching flag is not included in SSSG. For example, when UE detects a DCI 2_0 or other DCI format in the first SSSG, the UE switches to monitor PDCCHs in the second SSSG. The offset X of the second SSSG applies to the configured PDCCH monitoring occasion of the second SSSG.

In yet another option, since the configured search space set configurations in the second SSSG could be shifted by the offset X indicated by a DCI in the first SSSG, the REs that are not available for PDSCH transmission should be adapted accordingly. In NR, the time/frequency resource that is determined by a CORESET and a search space set configuration can be semi-statically configured as not available for PDSCH transmission. Further, the rate matching indicator in DCI format 1_1 and 1_2 can dynamically indicate PDSCH rate matching according to the resource in a rateMatchPatternGroup. The rateMatchPatternGroup may include the time/frequency resource that is determined by a CORESET and a search space set configuration. When the configured search space sets in the second SSSG are shifted by offset X, the semi-statically configured REs or dynamically indicated REs that are not available for PDSCH transmission can be shifted in same manner. On the other hand, a CSS set may not be shifted. Further, a USS in the first SSSG may to be shifted.

Switching Between PDCCH Monitoring Capabilities

Figure 3B:
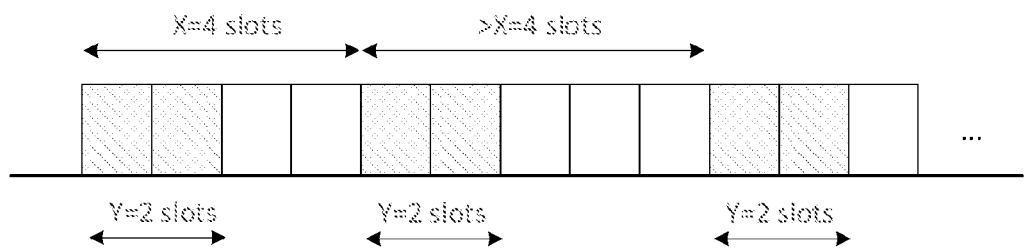
FIG. 3B illustrates an example of PDCCH monitoring capability that spans Y symbols with a gap of at least X slots, in accordance with some embodiments.

SSSG switching may be supported for the PDCCH monitoring of UE. The first SSSG configuration and the second SSSG configuration may be associated with different PDCCH monitoring capabilities on the definition of maximum numbers of monitored PDCCH candidates and non-overlapped CCEs. The PDCCH monitoring capabilities can be different from the way to count the number of monitored PDCCH candidates and non-overlapped CCEs (i.e. the above first or second option to define multi-slot PDCCH monitoring capabilities which are shown in FIG. 3A and FIG. 3B), and/or the maximum numbers of monitored PDCCH candidates and non-overlapped CCEs. Consequently, switching between first and second SSSG configuration may result in the switching between PDCCH monitoring capabilities.

In some embodiments, the switching between the first and second SSSG configuration may result in switching between a PDCCH monitoring capability on maximum numbers of monitored PDCCH candidates and non-overlapped CCEs that is defined per slot, and another multi-slot PDCCH monitoring capability on the corresponding maximum numbers that is defined in a group of slots.

In some other embodiments, the switching between the first and second SSSG configuration may result in switching between two different multi-slot PDCCH monitoring capabilities on maximum numbers of monitored PDCCH candidates and non-overlapped CCEs and both two PDCCH monitoring capabilities are defined in in a group of slots.

In NR, two sets of the maximum numbers for PDCCH monitoring are applicable for a serving cell. One set are the maximum numbers for PDCCH monitoring for one scheduled serving cell, which are denoted as $M_{PDCCH}^{max,slot,\mu}$ and $C_{PDCCH}^{max,slot,\mu}$ respectively. The other set is the maximum numbers that are calculated assuming multiple serving cells with the same SCS configuration $\mu$ in section 10.1 in TS38.213, which are denoted as $M_{PDCCH}^{total,slot,\mu}$ and $C_{PDCCH}^{total,slot,\mu}$ respectively. In NR, a single PDCCH monitoring capability is used for a cell which doesn't change dynamically.

If the multi-slot PDCCH monitoring capability is used and the PDCCH monitoring capability can be dynamically changed in time for a serving cell, the pattern of configured PDCCH monitoring occasions and the maximum numbers of monitored PDCCH candidates and non-overlapped CCEs may change accordingly. In the following descriptions, the above parameters $M_{PDCCH}^{max,slot,\mu}$, $C_{PDCCH}^{max,slot,\mu}$, $M_{PDCCH}^{total,slot,\mu}$ and $C_{PDCCH}^{total,slot,\mu}$ for a serving cell are respectively expressed as $M_{PDCCH}^{max}$, $C_{PDCCH}^{max}$, $M_{PDCCH}^{total}$, $C_{PDCCH}^{total}$.

For a serving cell that is configured with dynamic switching of PDCCH monitoring capability, e.g. SSSG switching, the maximum numbers $M_{PDCCH}^{max}$ and $C_{PDCCH}^{max}$ are determined by the corresponding maximum numbers of the active PDCCH monitoring capability of the serving cell. Further, the determination of $M_{PDCCH}^{total}$ and $C_{PDCCH}^{total}$ for a group of serving cells could be changed accordingly. The PDCCH monitoring capability, e.g. value X, or both value X and Y may be same for the group of serving cells. Alternatively, the PDCCH monitoring capability may have same maximum numbers of monitored PDCCH candidates and non-overlapped CCEs for the group of serving cells.

In some embodiments, for the serving cells configured with dynamic switching of PDCCH monitoring capability, e.g. SSSG switching, the maximum numbers $M_{PDCCH}^{total}$ and $C_{PDCCH}^{total}$ are separately determined for a licensed cell and a unlicensed cell.

In some embodiments, for the serving cells configured with dynamic switching of PDCCH monitoring capability, e.g. SSSG switching, the maximum numbers $M_{PDCCH}^{total}$ and $C_{PDCCH}^{total}$ are separately determined from the serving cells configured with semi-static or fixed PDCCH monitoring capability.

In some embodiments, for the serving cells configured with dynamic switching of PDCCH monitoring capability, e.g. SSSG switching, the maximum numbers $M_{PDCCH}^{total}$ and $C_{PDCCH}^{total}$ is determined for each serving cell separately. Consequently, the determined $M_{PDCCH}^{total}$ and $C_{PDCCH}^{total}$ cannot be shared among the serving cells. $M_{PDCCH}^{total}$ and $C_{PDCCH}^{total}$ for a serving cell is determined by the active PDCCH monitoring capability for the serving cell.

In some embodiments, for a serving cell configured with dynamic switching of PDCCH monitoring capability, e.g. SSSG switching, a reference tal PDCCH monitoring capability is used to derive $M_{PDCCH}^{total}$ and $C_{PDCCH}^{total}$ for the multiple serving cells.

In some embodiments, $M_{PDCCH}^{total}$ and $C_{PDCCH}^{total}$ may be separately determined for a first group of serving cells that start channel occupations and for a second group of serving cells that do not start channel occupations.

In some embodiments, if SSSG switching is commonly applied to a group of serving cells, the maximum numbers $M_{PDCCH}^{total}$ and $C_{PDCCH}^{total}$ is determined for the group of serving cells. In NR-U, a UE can be provided cellGroupsForSwitchList, indicating one or more groups of serving cells, SSSG switching separately applies within each group.

In some embodiments, if SSSG switching is commonly applied to a group of serving cells, $M_{PDCCH}^{total}$ and $C_{PDCCH}^{total}$ may be separately determined for a first sub-group of serving cells that start channel occupations and for a second sub-group of serving cells that do not start channel occupations. In NR-U, a UE can be provided cellGroupsForSwitchList, indicating one or more groups of serving cells, SSSG switching separately applies within each group.

In yet another embodiment, the UE capability on number of downlink cells $N_{cells}^{cap}$ for the PDCCH monitoring with a PDCCH monitoring capability can be different for the supported PDCCH monitoring capabilities. UE may separately report the $N_{cells}^{cap}$ values for the different PDCCH monitoring cap capabilities. Alternatively, UE may a $N_{cells}^{cap}$ value for a reference PDCCH monitoring capability. Then, the $N_{cells}^{cap}$ value for a PDCCH monitoring capability can be determined by the PDCCH monitoring capability and the reference PDCCH monitoring capability. For example, $N_{cells}^{cap}$ the values are inverse proportional to the maximum numbers of monitored PDCCH candidates and non-overlapped CCEs.

In another embodiment, for the serving cells configured with dynamic switching of two combinations (X, Y) of PDCCH monitoring capabilities, e.g. SSSG switching, the two combinations (X, Y) may be associated with same maximum numbers of monitored PDCCH candidates and non-overlapped CCEs. For example, the two combinations (X, Y1) and (X, Y2) have same value X, and the same maximum numbers of monitored PDCCH candidates and non-overlapped CCEs. The value X and the maximum numbers of monitored PDCCH candidates and non-overlapped CCEs for the serving cell can be used to determine $M_{PDCCH}^{total}$ and $C_{PDCCH}^{total}$ of the serving cells in CA operation in a period of X slots. Therefore, the dynamic switching of PDCCH monitoring capabilities for the serving cell doesn't impact the determination of $M_{PDCCH}^{total}$ and $C_{PDCCH}^{total}$ of the serving cells in CA operation.

In another embodiment, for the serving cells configured with dynamic switching of two combinations (X, Y) of PDCCH monitoring capabilities, e.g. SSSG switching, the maximum numbers of monitored PDCCH candidates and non-overlapped CCEs for the two combinations (X, Y) may be proportional to the values X. Specifically, per-slot PDCCH monitoring capability can be viewed as a combination (1, 1). Denote the two combinations as (X1, Y1) and (X2, Y2), X2 is integer time of X1, the two combinations (X1, Y1) and (X2, Y2) result in same maximum numbers of monitored PDCCH candidates and non-overlapped CCEs in time period X2. The value X2 and the maximum numbers of monitored PDCCH candidates and non-overlapped CCEs of combinations (X2, Y2) can be used to determine $M_{PDCCH}^{total}$ and $C_{PDCCH}^{total}$ of the serving cells in CA operation in a period of X2 slots. Therefore, the dynamic switching between two combinations (X1, Y1) and (X2, Y2) for the serving cell doesn't impact the determination of $M_{PDCCH}^{total}$ and $C_{PDCCH}^{total}$ of the serving cells in CA operation.

Figure 9:
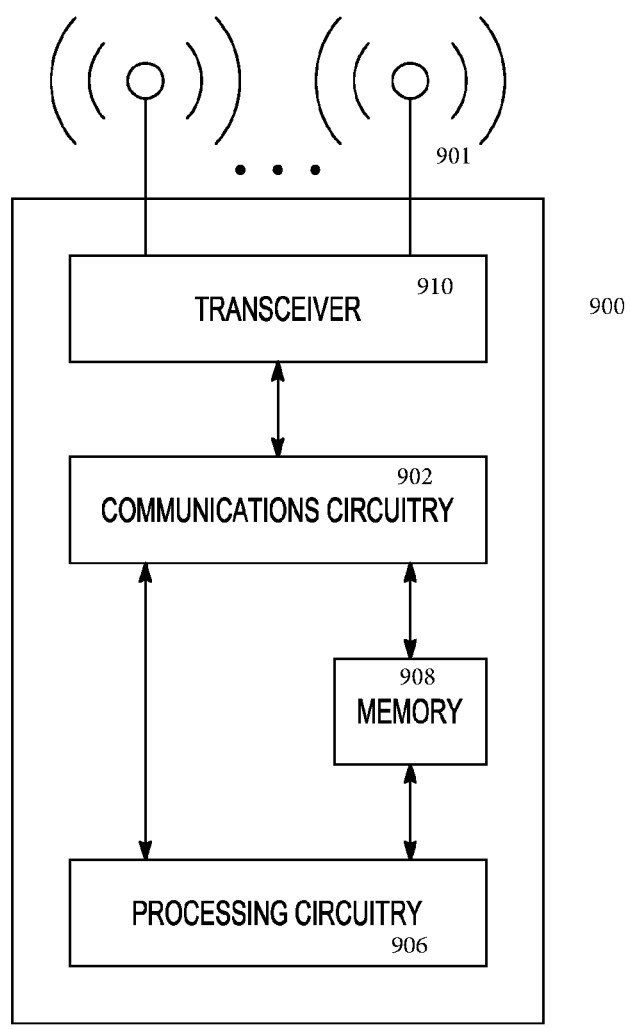
FIG. 9 illustrates a functional block diagram of a wireless communication device, in accordance with some embodiments.

FIG. 9 illustrates a functional block diagram of a wireless communication device, in accordance with some embodiments. Wireless communication device 900 may be suitable for use as a UE or gNB configured for operation in a 5G NR network.

The communication device 900 may include communications circuitry 902 and a transceiver 910 for transmitting and receiving signals to and from other communication devices using one or more antennas 901. The communications circuitry 902 may include circuitry that can operate the physical layer (PHY) communications and/or medium access control (MAC) communications for controlling access to the wireless medium, and/or any other communications layers for transmitting and receiving signals. The communication device 900 may also include processing circuitry 906 and memory 908 arranged to perform the operations described herein. In some embodiments, the communications circuitry 902 and the processing circuitry 906 may be configured to perform operations detailed in the above figures, diagrams, and flows.

In accordance with some embodiments, the communications circuitry 902 may be arranged to contend for a wireless medium and configure frames or packets for communicating over the wireless medium. The communications circuitry 902 may be arranged to transmit and receive signals. The communications circuitry 902 may also include circuitry for modulation/demodulation, upconversion/downconversion, filtering, amplification, etc. In some embodiments, the processing circuitry 906 of the communication device 900 may include one or more processors. In other embodiments, two or more antennas 901 may be coupled to the communications circuitry 902 arranged for sending and receiving signals. The memory 908 may store information for configuring the processing circuitry 906 to perform operations for configuring and transmitting message frames and performing the various operations described herein. The memory 908 may include any type of memory, including non-transitory memory, for storing information in a form readable by a machine (e.g., a computer). For example, the memory 908 may include a computer-readable storage device, read-only memory (ROM), random-access memory (RAM), magnetic disk storage media, optical storage media, flash-memory devices and other storage devices and media.

In some embodiments, the communication device 900 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 900 may include one or more antennas 901. The antennas 901 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 900 may include one or more of a keyboard, a display, a non-volatile memory port, multiple antennas, a graphics processor, an application processor, speakers, and other mobile device elements. The display may be an LCD screen including a touch screen.

Although the communication device 900 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 900 may refer to one or more processes operating on one or more processing elements. CL Examples Example 1 may include a method of wireless communication for PDCCH monitoring capability handling and search space set configurations.

Example 2 may include the method of example 1 or some other example herein, wherein if the PDCCH monitoring capability is defined in the Y slots in a groups of X slot, or in a span of Y slots of combination (X, Y), if the numbers of monitored PDCCH candidates and/or non-overlapped CCEs in the Y slots exceed the corresponding maximum numbers, dropping USS sets is done until the corresponding maximum numbers are not exceeded.

Example 3 may include the method of example 2 or some other example herein, wherein if a USS set configured in multiple slots in the Y slots, and if the USS set is to be dropped, the USS set is dropped in all the multiple slots Example 4 may include the method of example 2 or some other example herein, wherein if a USS set configured in multiple slots in the Y slots, and if the USS set is to be dropped, UE drops the MOs of the USS set in one remaining slot of the multiple slots.

Example 5 may include the method of example 1 or some other example herein, wherein if the PDCCH monitoring capability is defined in the Y slots in a groups of X slot, or in a span of Y slots of combination (X, Y), the maximum numbers of monitored PDCCH candidates and non-overlapped CCEs for a serving cell in carrier aggregation are determined by X and Y Example 6 may include the method of example 5 or some other example herein, wherein same maximum numbers are determined for the serving cells with the same configuration and PDCCH monitoring capability with same X and Y.

Example 7 may include the method of example 5 or some other example herein, wherein same maximum numbers are determined for the serving cells with the same configuration µ and PDCCH monitoring capability with same X.

Example 8 may include the method of example 5 or some other example herein, wherein same maximum numbers are determined for the serving cells with the same absolute duration of the X slots.

Example 9 may include the method of example 5 or some other example herein, wherein same maximum numbers are determined for the serving cells with the same absolute durations of the X and Y slots.

Example 10 may include the method of example 1 or some other example herein, wherein a UE is capable of one or multiple combinations (X, Y) of multi-slot PDCCH monitoring capabilities, with or without the support of per-slot PDCCH monitoring capability.

Example 11 may include the method of example 10 or some other example herein, wherein the multiple combinations (X, Y) have same X and different Y and associate with same maximum numbers of monitored PDCCH candidates and non-overlapped CCEs in a period of X slots.

Example 12 may include the method of example 10 or some other example herein, wherein the maximum numbers of monitored PDCCH candidates and non-overlapped CCEs for the combinations (X, Y) are proportional to the values X.

Example 13 may include the method of examples 12 or 13 or some other example herein, per-slot PDCCH monitoring capability is viewed as a combination (1, 1).

Example 14 may include the method of example 10 or some other example herein, if a UE supports multiple combinations (X, Y) of multi-slot PDCCH monitoring capabilities, and if the configured search space sets of the UE satisfy two or more of the multiple combinations (X, Y), the UE monitors PDCCH according to one combination (X, Y) from the two or more combinations (X, Y).

Example 15 may include the method of example 14 or some other example herein, the combination (X, Y) is associated with the largest maximum numbers of monitored PDCCH candidates and non-overlapped CCEs in the Y slots of the two or more combinations (X, Y).

Example 16 may include the method of example 14 or some other example herein, the combination (X, Y) is associated with the largest value X of the two or more combinations (X, Y).

Example 17 may include the method of example 14 or some other example herein, the combination v)(X, Y) is associated with the smallest value Y of the two or more combinations (X, Y).

Example 18 may include the method of example 14 or some other example herein, the combination (X, Y) is determined by one or more of the following parameters in a priority:
  maximum numbers of monitored PDCCH candidates and non-overlapped CCEs in the Y slots of the two or more combinations (X, Y);
  value X of the two or more combinations (X, Y);
  value Y of the two or more combinations (X, Y).

Example 19 may include the method of example 1 or some other example herein, if two search space set groups (SSSGs) are configured for the PDCCH monitoring, an offset X to shift the configured search space set(s) in the second SSSG is indicated by a DCI format in the first SSSG.

Example 20 may include the method of example 19 or some other example herein, DCI format 2_0 indicates a SSSG switching flag and an offset X, or jointly indicates the SSSG switching and the offset X or indicates an offset X only.

Example 21 may include the method of example 19 or some other example herein, the REs that are not available for PDSCH transmission are adapted accordingly.

Example 22 may include the method of example 1 or some other example herein, for a serving cell that is configured with dynamic switching of PDCCH monitoring capability, the maximum numbers M_PDCCH^max and C_PDCCH^max are determined by the corresponding maximum numbers of the active PDCCH monitoring capability of the serving cell.

Example 23 may include the method of example 1 or some other example herein, the determination of M_"PDCCH" ^"total" and C_"PDCCH" ^"total" for a group of serving cells is changed considering the dynamic switching of PDCCH monitoring capability.

Example 24 may include the method of example 19 or some other example herein, the maximum numbers M_"PDCCH" ^"total" and C_"PDCCH" ^"total" are separately determined for a licensed cell and a unlicensed cell.

Example 25 may include the method of example 19 or some other example herein, the maximum numbers M_"PDCCH" ^"total" and C_"PDCCH" ^"total" is determined for each serving cell separately.

Example 26 may include the method of example 19 or some other example herein, a reference PDCCH monitoring capability is used to derive M_"PDCCH" ^"total" and C_"PDCCH" ^"total" for the multiple serving cells.

Example 27 may include the method of example 19 or some other example herein, M_"PDCCH" ^"total" and C_"PDCCH" ^"total" are separately determined for a first group of serving cells that start channel occupations and for a second group of serving cells that do not start channel occupations.

Example 28 may include the method of example 27 or some other example herein, if SSSG switching is commonly applied to a group of serving cells, the maximum numbers M_"PDCCH" ^"total" and C_"PDCCH" ^"total" is determined for the group of serving cells.

Example 29 may include the method of example 19 or some other example herein, the multiple PDCCH monitoring capabilities has the same maximum number of monitored PDCCH candidates and non-overlapped CCEs in a time period, M_"PDCCH" ^"total" and C_"PDCCH" ^"total" is determined in the time period.

Example 30 may include the method of example 1 or some other example herein, the UE capability on number of downlink cells N_"cells" ^"cap" for the PDCCH monitoring with a PDCCH monitoring capability are different for the supported PDCCH monitoring capabilities.

Example 31 includes a method of a user equipment (UE), the method comprising:
  receiving, by the UE, a search space set group (SSSG); and
  performing, by the UE, physical downlink control channel (PDCCH) monitoring of one or more (Y) slots in a group of (X) slots, or in a span of Y slots of combination (X, Y), wherein a number of monitored PDCCH candidates or non-overlapped control channel elements (CCEs) in the Y slots exceeds a corresponding maximum number, and the PDCCH monitoring includes dropping UE-specific search space (USS) sets until the corresponding maximum number is not exceeded.

Example 32 includes the method of example 31 or some other example herein, wherein a USS set is configured in multiple slots in the Y slots, and if a particular USS set is to be dropped, the particular USS set is dropped in all the multiple slots Example 33 includes the method of example 31 or some other example herein, wherein a USS set is configured in multiple slots in the Y slots, and if the USS set is to be dropped, the UE drops measurement objects (MOs) of the USS set in one remaining slot of the multiple slots.

Example 34 includes the method of example 31 or some other example herein, further comprising determining a first maximum number of monitored PDCCH candidates and non-overlapped CCEs that is defined per slot, and a second maximum number of monitored PDCCH candidates defined in a group of slots.

Example 35 includes the method of example 34 or some other example herein, wherein the first and second maximum numbers are determined based on an active PDCCH monitoring capability of a serving cell.

Example 36 includes the method of example 34 or some other example herein, wherein the first and second maximum numbers are determined for a group of serving cells based on dynamic switching of a PDCCH monitoring capability.

Example 37 includes the method of example 34 or some other example herein, wherein the first and second maximum numbers are determined separately determined for a licensed cell and an unlicensed cell.

Example 38 includes the method of example 34 or some other example herein, wherein the first and second maximum numbers are separately determined based on one or more serving cells configured with a semi-static or fixed PDCCH monitoring capability.

Example 39 may include the method of example 31 or some other example herein, wherein the UE supports multiple combinations (X, Y) of multi-slot PDCCH monitoring capabilities, wherein the configured search space sets of the UE satisfy two or more of the multiple combinations (X, Y), and wherein the method further comprises selecting a first combination (X, Y) for PDCCH monitoring from the two or more combinations (X, Y).

Example 40 may include the method of example 39 or some other example herein, wherein the selected first combination is associated with the largest maximum numbers of monitored PDCCH candidates and non-overlapped CCEs in the Y slots of the two or more combinations (X, Y).

Example 41 may include the method of example 39 or some other example herein, wherein the selected first combination (X, Y) is associated with the largest value X of the two or more combinations (X, Y).

Example 42 may include the method of example 39 or some other example herein, wherein the selected first combination (X, Y) is associated with the smallest value Y of the two or more combinations (X, Y).

Example 43 may include the method of example 39 or some other example herein, wherein the first combination is selected based on one or more of the following parameters:
  maximum numbers of monitored PDCCH candidates and non-overlapped CCEs in the Y slots of the two or more combinations (X, Y);
  value X of the two or more combinations (X, Y);
  value Y of the two or more combinations (X, Y);

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A user equipment (UE) configured for operation in a fifth-generation new radio (NR) system, the UE comprising: processing circuitry; and memory, the processing circuitry configured to:
decode higher-layer signalling comprising configuration information received from a gNodeB (gNB), the configuration information to configure the UE with UE-specific search space (USS) sets for multi-slot physical downlink control channel (PDCCH) monitoring,
wherein for the USS sets, the configuration information indicates a PDCCH monitoring pattern that indicates a number of slots in a group of consecutive slots,
perform multi-slot PDCCH monitoring by monitoring a maximum number of non-overlapped control-channel elements (CCEs) for corresponding PDCCH candidates in each group of consecutive slots,
wherein for a serving cell with a subcarrier spacing (SCS) configuration of one of 480 kHz and 960 kHz, the number of slots within each group of consecutive slots that the UE is to monitor for PDCCH candidates is no more than half the number of slots in each group of slots.

2. The UE of claim 1, wherein for a serving cell with the SCS configuration of 480 kHz, the maximum number of PDCCH candidates is twenty for groups of four consecutive slots.

3. The UE of claim 2, wherein for a serving cell with the SCS configuration of 960 KHz, the maximum number of PDCCH candidates is ten for groups of four consecutive slots and the maximum number of PDCCH candidates is twenty for groups of eight consecutive slots.

4. The UE of claim 3, wherein for a serving cell with the SCS configuration of 480 kHz, the maximum number of non-overlapped CCEs is thirty-two for the groups of four consecutive slots.

5. The UE of claim 4, wherein for a serving cell with the SCS configuration of 960 KHz, the maximum number of non-overlapped CCEs is sixteen for groups of four consecutive slots and the maximum number of non-overlapped CCEs is thirty-two for the groups of eight consecutive slots.

6. The UE of claim 5, wherein a PDCCH monitoring capability of the UE is indicated as combinations of the number of slots in a group consecutive slots.

7. The UE of claim 6, wherein the processing circuitry configures the UE to perform the multi-slot PDCCH monitoring by monitoring the maximum number of non-overlapped CCEs for corresponding PDCCH candidates at monitoring occasions in each group of consecutive slots.

8. The UE of claim 6, wherein the processing circuitry is configured to refrain from monitoring more than the maximum number of non-overlapped CCEs for corresponding PDCCH candidates in each group of consecutive slots.

9. The UE of claim 6, wherein the processing circuitry is configured to drop one or more of the USS sets that have more than the maximum number of non-overlapped CCEs configured for monitoring corresponding PDCCH candidates in each group of consecutive slots.

10. The UE of claim 6, wherein the processing circuitry is to configure the UE to perform the multi-slot PDCCH monitoring by monitoring the non-overlapped CCEs on an active downlink bandwidth part (DL-BWP) of the serving cell for the corresponding PDCCH candidates in each group of consecutive slots,
wherein the active DL-BWP uses a carrier frequency above 52.6 GHz for the SCS configurations of 480 kHz and 960 kHz.

11. A non-transitory computer-readable storage medium that stores instructions for execution by processing circuitry a user equipment (UE) configured for operation in a fifth-generation new radio (NR) system, the processing circuitry configured to:
decode higher-layer signalling comprising configuration information received from a gNodeB (gNB), the configuration information to configure the UE with UE-specific search space (USS) sets for multi-slot physical downlink control channel (PDCCH) monitoring,
wherein for the USS sets, the configuration information indicates a PDCCH monitoring pattern that indicates a number of slots in a group of consecutive slots,
perform multi-slot PDCCH monitoring by monitoring a maximum number of non-overlapped control-channel elements (CCEs) for corresponding PDCCH candidates in each group of consecutive slots,
wherein for a serving cell with a subcarrier spacing (SCS) configuration of one of 480 kHz and 960 kHz, the number of slots within each group of consecutive slots that the UE is to monitor for PDCCH candidates is no more than half the number of slots in each group of slots.

12. The Non-transitory computer-readable storage medium of claim 11, wherein for a serving cell with the SCS configuration of 480 kHz, the maximum number of PDCCH candidates is twenty for groups of four consecutive slots.

13. The Non-transitory computer-readable storage medium of claim 12, wherein for a serving cell with the SCS configuration of 960 KHz, the maximum number of PDCCH candidates is ten for groups of four consecutive slots and the maximum number of PDCCH candidates is twenty for groups of eight consecutive slots.

14. The Non-transitory computer-readable storage medium of claim 13, wherein for a serving cell with the SCS configuration of 480 kHz, the maximum number of non-overlapped CCEs is thirty-two for the groups of four consecutive slots.

15. The Non-transitory computer-readable storage medium of claim 14, wherein for a serving cell with the SCS configuration of 960 KHz, the maximum number of non-overlapped CCEs is sixteen for groups of four consecutive slots and the maximum number of non-overlapped CCEs is thirty-two for the groups of eight consecutive slots.

16. The Non-transitory computer-readable storage medium of claim 15, wherein a PDCCH monitoring capability of the UE is indicated as combinations of the number of slots in a group consecutive slots.

17. The Non-transitory computer-readable storage medium of claim 16, wherein the processing circuitry configures the UE to perform the multi-slot PDCCH monitoring by monitoring the maximum number of non-overlapped CCEs for corresponding PDCCH candidates at monitoring occasions in each group of consecutive slots.

18. An apparatus of a gNode B (gNB) configured for operation in a fifth-generation new radio (NR) system, the apparatus comprising: processing circuitry and memory, the processing circuitry configured to:
encode higher-layer signalling comprising configuration information to configure a user equipment (UE) with UE-specific search space (USS) sets for multi-slot physical downlink control channel (PDCCH) monitoring,
wherein for the USS sets, the configuration information indicates a PDCCH monitoring pattern that indicates a number of slots in a group of consecutive slots, the configuration information to configure the UE to perform multi-slot PDCCH monitoring by monitoring a maximum number of non-overlapped control-channel elements (CCEs) for corresponding PDCCH candidates in each group of consecutive slots,
wherein for a serving cell with a subcarrier spacing (SCS) configuration of one of 480 kHz and 960 kHz, the number of slots within each group of consecutive slots that the UE is to monitor for PDCCH candidates is no more than half the number of slots in each group of slots.

19. The apparatus of claim 18, wherein for a serving cell with the SCS configuration of 480 kHz, the maximum number of PDCCH candidates is twenty for groups of four consecutive slots, and
wherein for a serving cell with the SCS configuration of 960 KHz, the maximum number of PDCCH candidates is ten for groups of four consecutive slots and the maximum number of PDCCH candidates is twenty for groups of eight consecutive slots.

20. The apparatus of claim 19, wherein for a serving cell with the SCS configuration of 480 kHz, the maximum number of non-overlapped CCEs is thirty-two for the groups of four consecutive slots, and
wherein for a serving cell with the SCS configuration of 960 KHz, the maximum number of non-overlapped CCEs is sixteen for groups of four consecutive slots and the maximum number of non-overlapped CCEs is thirty-two for the groups of eight consecutive slots.

* * * * *